Figure 1:
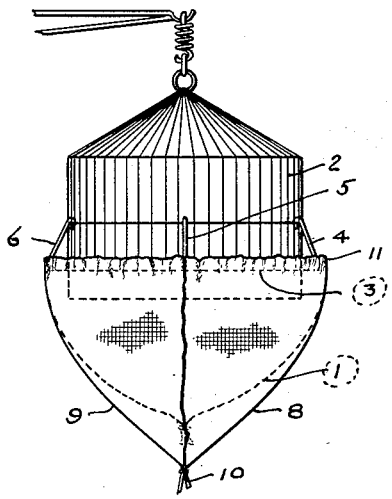

May 28, 1935.    M. D. ROBISON    2,002,925

COVER BAG FOR CAGES

Filed June 6, 1934

INVENTOR.
Merritt D. Robison
BY George J. Henry
ATTORNEY

Patented May 28, 1935

2,002,925

UNITED STATES PATENT OFFICE 2,002,925

COVER BAG FOR CAGES

Merritt D. Robison, San Francisco, Calif.

Application June 6, 1934, Serial No. 729,260

8 Claims. (Cl. 119—17)

My invention has for its object a suitable cover bag especially adapted to cover a bird cage while also useful for other purposes.

A further object is such a cover bag with a bottom portion which at all times is suitably positioned to catch seed, hulls and the like which the bird throws or which otherwise drop from the cage. My cover bag is adapted to all shapes of cages.

A further object is such a cover bag adapted to partly or completely cover the cage.

A further object is a cover and seed catcher combined such that there is no opening between the upper and lower portions; hence, when in the closed position there is no opening through which seed can escape.

Other objects will appear from the drawing and specification.

By referring to the drawing which shows a preferred form, my invention will be made clear.

Figure 2:
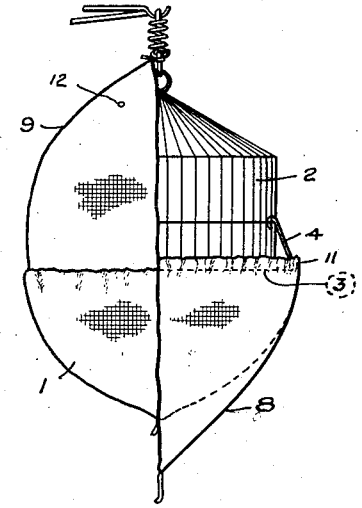
Figure 3:
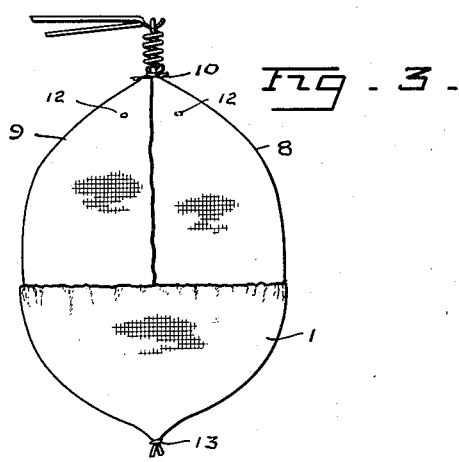
Figure 4:
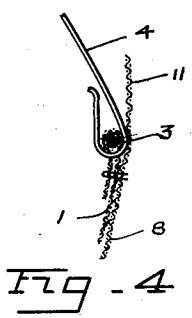
Figure 5:
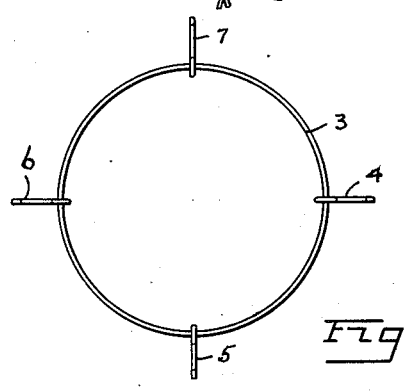
Figure 6:
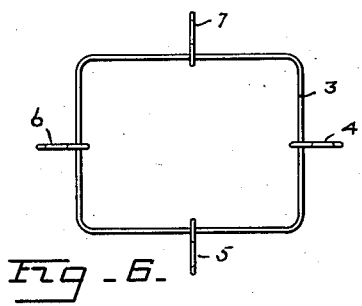

In the drawing Fig. 1 shows a side view of my cover bag with the upper portion brought down and tied outside the lower or seed catching portion. Fig. 2 is the same as Fig. 1 except that one of the upper sections has been brought up and over the cage in position to protect it from draughts. Fig. 3 shows the bag in final position completely enclosing the cage. Fig. 4 is a fragmentary cross section through the joint between the upper and lower portions as shown by the encircling wire hook 4 in Figs. 1 and 2. Fig. 5 is a plan of the frame wire and hooks for a circular cage, while Fig. 6 shows the same wire bent for a square cage.

Throughout the figures similar numerals refer to identical parts.

The lower portion is shown by the numeral 1 and is preferably gathered to form a cup or bowl shaped portion of suitable textile material and to completely close the lower part of the cage 2. About the periphery of the lower portion is a frame wire 3, or in lieu thereof a string may be employed if preferred. From the wire 3—or string—hooks as 4, 5, 6 and 7 extend to engage parts of the cage and thus support the cover bag therefrom. The upper portion of the cover bag is similar to the bottom portion but preferably deeper and consisting of a plurality of sections 8, 9. These sections 8, 9, are stitched about the periphery of the lower section 1 along the edge enclosing the said wire 3, or string, and are so cut that when brought together over the upper portion of the cage 2 and tied as with the tape 10 they, with the lower portion 1, completely enclose the cage 2. See Fig. 3. By disengaging the tape 10 either of the sections 8 or 9 may be folded down into the position shown in Fig. 2. Thus the cage may be partly opened to light and air on one side while the opposite side is fully protected as against draughts or sun. Or both sections 8 and 9 may be folded down and the tape 10 tied under the lower portion 1 as shown in Fig. 1, thus fully exposing the cage while the bottom portion 1 still remains in place as a seed catcher. In the preferred form I provide the flounce 11 between the upper and lower portions which gives a finished appearance to the whole and extends the range of seed catching without too greatly confining the lower part of the cage. Although I have shown the cage 2 as circular, the cover bag is suitable for any shape as the wire 3 may be bent to suit the contour of the cage.

It will now be seen that the cover bag of my invention will allow the cage to be fully or partially protected or exposed as may be desired, while at all times retaining the seed catcher in efficient position. If the cover bag is made of very closely woven or relatively impervious material, ventilation eyelets 12, 12, may be introduced into the upper sections as desired. The seed that collects in the lower portion may be discharged through a suitable opening by untying the tape 13 without removing the entire bag from the cage.

I claim:

1. A cover bag for cages, comprising an upper bag portion and a lower bag portion having horizontal edges, said portions fixed together about their horizontal edges, said upper portion consisting of a plurality of sections adapted to close over said cage or hang down about and under said lower portion.

2. A cover bag for cages, comprising an upper bag portion and a lower bag portion having horizontal edges, said portions fixed together about their horizontal edges, said upper portion consisting of a plurality of sections adapted to close over said cage or hang down about and under said lower portion, a wire extending about the horizontal periphery of the bag, and fastening means adapted to engage the bag and the cage.

3. A cover bag for cages, comprising an upper portion and a lower portion having horizontal edges, said lower portion adapted to enclose the bottom of a cage and said upper portion comprising a plurality of sections adapted together to entirely enclose all the remainder of the cage, the upper and lower portions being joined about their horizontal edges, and means associated with said joint and adapted to support said cover bag from said cage.

4. A cover bag for cages, comprising a lower bag portion adapted to encompass the bottom of a cage and gathered on its lower edge to form a seed catcher, an upper portion consisting of a plurality of sections together forming a covering for the balance of the cage, said sections being affixed about the upper periphery of said lower section, and fastening means holding said sections in closed relation about the cage.

5. A cover bag for cages, comprising an upper portion and a lower portion having horizontal edges, said lower portion adapted to enclose the bottom of a cage and said upper portion comprising a plurality of sections adapted together to entirely enclose all the remainder of the cage, the upper and lower portions being joined about their horizontal edges, and means associated with said joint and adapted to support said cover bag from said cage.

6. A cover bag for cages, comprising a lower bag portion adapted to encompass the bottom of a cage and gathered on its lower edge to form a seed catcher, an upper portion consisting of a plurality of sections together forming a covering for the balance of the cage, said sections being affixed about the upper periphery of said lower section, fastening means holding said sections in closed relation about the cage, and means adapted to hold the bag to the cage.

7. A cover bag for cages, comprising an upper portion and a lower portion having horizontal edges, said lower portion adapted to enclose the bottom of a cage and said upper portion comprising a plurality of sections adapted together to entirely enclose all the remainder of the cage, the upper and lower portions being joined about their horizontal edges, means associated with said joint and adapted to support said cover bag from said cage, and a frame wire about said periphery to which said bag portions are fixed.

8. A cover bag for cages, comprising a lower bag portion adapted to encompass the bottom of a cage and gathered on its lower edge to form a seed catcher, an upper portion consisting of a plurality of sections together forming a covering for the balance of the cage, said sections being affixed about the upper periphery of said lower section, fastening means holding said sections in closed relation about the cage, means adapted to hold the bag to the cage, and a frame wire about said periphery to which said bag portions are fixed.

MERRITT D. ROBISON.